June 1, 1965  E. T. HUNGERFORD  3,187,252
ELECTROMAGNETIC WELL SURVEYING METHOD AND APPARATUS FOR
OBTAINING BOTH A DIP AND CONDUCTIVITY ANISOTROPY
OF A FORMATION
Filed Dec. 18, 1961  7 Sheets-Sheet 1

INVENTOR:
E. T. HUNGERFORD
BY: Theodore E. Bieber
HIS ATTORNEY

INVENTOR:
E. T. HUNGERFORD
BY: Theodore E. Bieber
HIS ATTORNEY

June 1, 1965

E. T. HUNGERFORD 3,187,252

ELECTROMAGNETIC WELL SURVEYING METHOD AND APPARATUS FOR
OBTAINING BOTH A DIP AND CONDUCTIVITY ANISOTROPY
OF A FORMATION

Filed Dec. 18, 1961

INVENTOR:
E. T. HUNGERFORD
BY: Theodore E. Bieber

HIS ATTORNEY

INVENTOR:
E. T. HUNGERFORD
BY: Horace E. Biber
HIS ATTORNEY

June 1, 1965  E. T. HUNGERFORD  3,187,252
ELECTROMAGNETIC WELL SURVEYING METHOD AND APPARATUS FOR
OBTAINING BOTH A DIP AND CONDUCTIVITY ANISOTROPY
OF A FORMATION
Filed Dec. 18, 1961  7 Sheets-Sheet 6

INVENTOR:
E. T. HUNGERFORD
BY: *Edward E. Bieber*
HIS ATTORNEY

June 1, 1965 E. T. HUNGERFORD 3,187,252
ELECTROMAGNETIC WELL SURVEYING METHOD AND APPARATUS FOR
OBTAINING BOTH A DIP AND CONDUCTIVITY ANISOTROPY
OF A FORMATION
Filed Dec. 18, 1961 7 Sheets-Sheet 7

INVENTOR
E. T. HUNGERFORD
BY Theodore E. Bieler
HIS ATTORNEY

United States Patent Office 3,187,252
Patented June 1, 1965

3,187,252
ELECTROMAGNETIC WELL SURVEYING METHOD AND APPARATUS FOR OBTAINING BOTH A DIP AND CONDUCTIVITY ANISOTROPY OF A FORMATION
Ernest T. Hungerford, Bellaire, Tex., assignor to Shell Oil Company, New York, N.Y., a corporation of Delaware
Filed Dec. 18, 1961, Ser. No. 160,019
3 Claims. (Cl. 324—6)

This invention pertains to the logging of boreholes that penetrate formations of the earth and more particularly to electromagnetic borehole logging.

In a copending application of E. T. Hungerford and C. H. Fay, entitled "Electromagnetic Earth Surveying Apparatus," Serial No. 667,517, filed June 24, 1957, now Patent No. 3,014,177, of which this application is a continuation-in-part, there is disclosed a method of electromagnetic surveying in which certain formation characteristics are measured. Specifically, a method was disclosed whereby the magnitude and direction of dip of a formation penetrated by a borehole can be measured. The simple apparatus described which practices the methods of measurement of the several formation characteristics has certain disadvantages: A principal disadvantage is the rather critical positioning of the detector coil means necessary to obtain the desired signals. Another disadvantage is the sensitivity of the detector coil means to errors of position, alignment and tuning.

The present invention is an improved arrangement of coils and detection circuitry that produces the desired signals and is not principally affected by detector coil means positioning or changes thereof and which practices the same methods as disclosed in the referenced application. Other advantages will become apparent as the improved arrangement is disclosed. In particular, two new measurements of heretofore unmeasured formation characteristics are made.

Accordingly, a principal object of this invention is to provide an improved electromagnetic surveying tool that is not affected by errors in the mechanical positioning or orientation of the detector coil positions.

Another object of this invention is to provide an electromagnetic logging system whose coil arrangement and circuitry arrangement result in detected signals proportional to a component of formation conductivity anisotropy, hereinafter called "horizontal or formation bedding plane conductivity anisotropy."

A further object of this invention is to provide an improved electromagnetic logging tool with at least two additional detector coils whose axes are mutually parallel, and whose induced signals when suitably combined result in a signal proportional to the formation conductivity, hereinafter called formation horizontal or bedding conductivity.

A still further object of this invention is to provide an electromagnetic logging system having at least a third additional detector coil the axis of which is mutually orthogonal with the aforementioned two additional detector coils and whose induced signals when suitably combined with other signals as hereinafter explained will result in a signal that is proportional to another component of formation conductivity anisotropy, hereinafter called "transverse conductivity anisotropy."

A still further object of this invention is to provide an electromagnetic logging system having a coil arrangement and electrical circuitry arrangement such that the desired detected signals result from a so-called null measuring technique.

A still further object of this invention is to provide an electromagnetic logging system having an electrical circuitry arrangement such that the desired detected signals are insensitive to errors due to coil tuning changes that often result from temperature effects as is well known to the art.

The above objects and advantages of this invention are achieved by providing a modified arrangement of source and detector coils and by utilizing an arrangement of electronic circuitry such that full advantage is taken of all induced signals obtained from the various detector coils.

There is provided in the detecting head of this invention a plurality of coils, a minimum number of which are disclosed to perform the various measurements as will be more fully described hereinafter. The first coil is a magnetic compass coil that detects the earth's magnetic field and is used in conjunction with the inclinometer device to determine the disposition of the logging tool within the borehole space. The second and third coils are two source coils oriented with mutually orthogonal axes which furnish the electromagnetic fields utilized in the practicing of this invention. The fourth coil is a dip detector coil that principally detects formation dip and direction and which can also detect other characteristics as will be more fully explained hereinafter. The fifth and sixth coils are conductivity coils that when suitably utilized detect formation horizontal conductivity. Finally there is provided a seventh coil called a transverse conductivity anisotropy coil that when suitably utilized principally detects the ratio of conductivity perpendicular to formation bedding planes to horizontal or bedding plane conductivity. All of the above-mentioned coils are considered as being oriented in preferred directions with respect to the axis of the tool and furthermore all of the coils are assumed fixedly positioned with respect to each other; finally the complete coil assembly or detection head is considered as a rigid body and is used to radially scan the borehole substantially about the borehole axis.

The above objects, advantages, and functions of the various component parts will be more easily understood from the following descriptions when taken in conjunction with the attached drawings in which.

Figure 1:
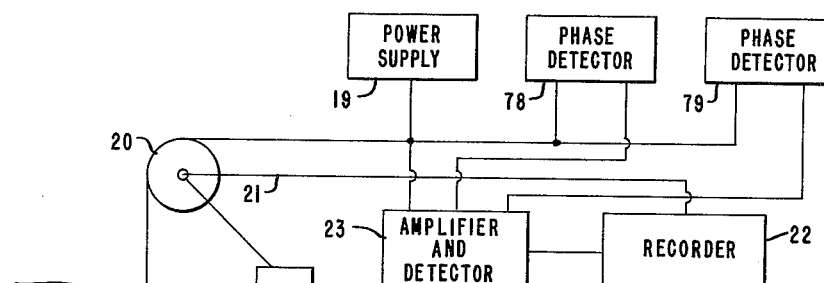
FIGURE 1 is a vertical section of a borehole showing the logging instrument constructed in accordance with this invention therein.
Figure 1:
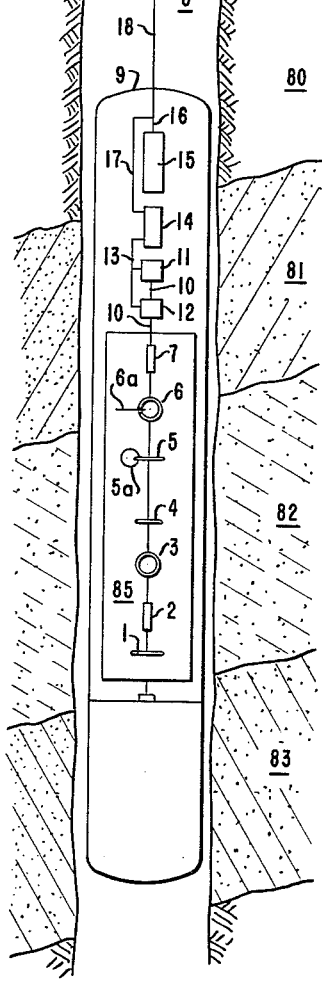

Reference may now be made to FIGURE 1. There is shown a borehole 8 penetrating various formations 80, 81, 82 and 83 having a logging tool 9 disposed therein. The logging tool 9 is provided with a plurality of coils 1–7 contained in a detection head 85 disposed on a shaft 10 which is driven by a motor means 11. The coil 1 is one of the conductivity coils; the coil 2 is the dip coil; the coil 3 is the transverse conductivity anisotropy coil; the coil 4 is the other conductivity coil; the coil 5 is the vertical source coil; the coil 6 is the horizontal source coil; and the coil 7 is the magnetic compass coil. The two coils 5a and 6a are so-called current pick up reference coils of the respective source coils 5 and 6. The leads to and from the various coils are suitably coupled to the movable portions of the slip ring assembly 12. These leads are thereby connected to a plurality of conductors contained in cable 13 which is in turn connected to the electrical and electronic circuits 14. The circuits 14 will be more fully described with relation to FIGURES 2, 5 and 7. The hole drift and inclination are relatively determined by inclinometer device 15 which is connected to cable 16. The output signals from circuits 14 are connected to cable 17; both cables 16 and 17 are suitably connected to the well logging cable 18, through which all signals are suitably transmitted to the surface equipment. The well logging cable 18 in addition to providing the necessary circuits for transmitting signals to the surface equipment, is provided preferably with circuits for the transmission of power from the surface-located power source 19 to the logging tool 9. The logging cable should have sufficient mechanical strength to permit lowering the logging tool into the borehole and retrieving it therefrom. The logging cable at the surface passes over a measuring sheave 20 which is coupled by means of lead 21 to a recording device 22. The recording device is thus driven in synchronism with the measuring sheave so that the signals recorded thereon will bear a fixed relationship to the depth in the borehole at which the logging tool is disposed. The signals transmitted over logging cable 18 from the tool 9 are suitably amplified and detected in circuits 23 and are coupled via cable to recording means 22 and thereby recorded. Phase comparison of several signals transmitted from the logging tool is also accomplished in phase detectors 78 and 79.

Figure 2:
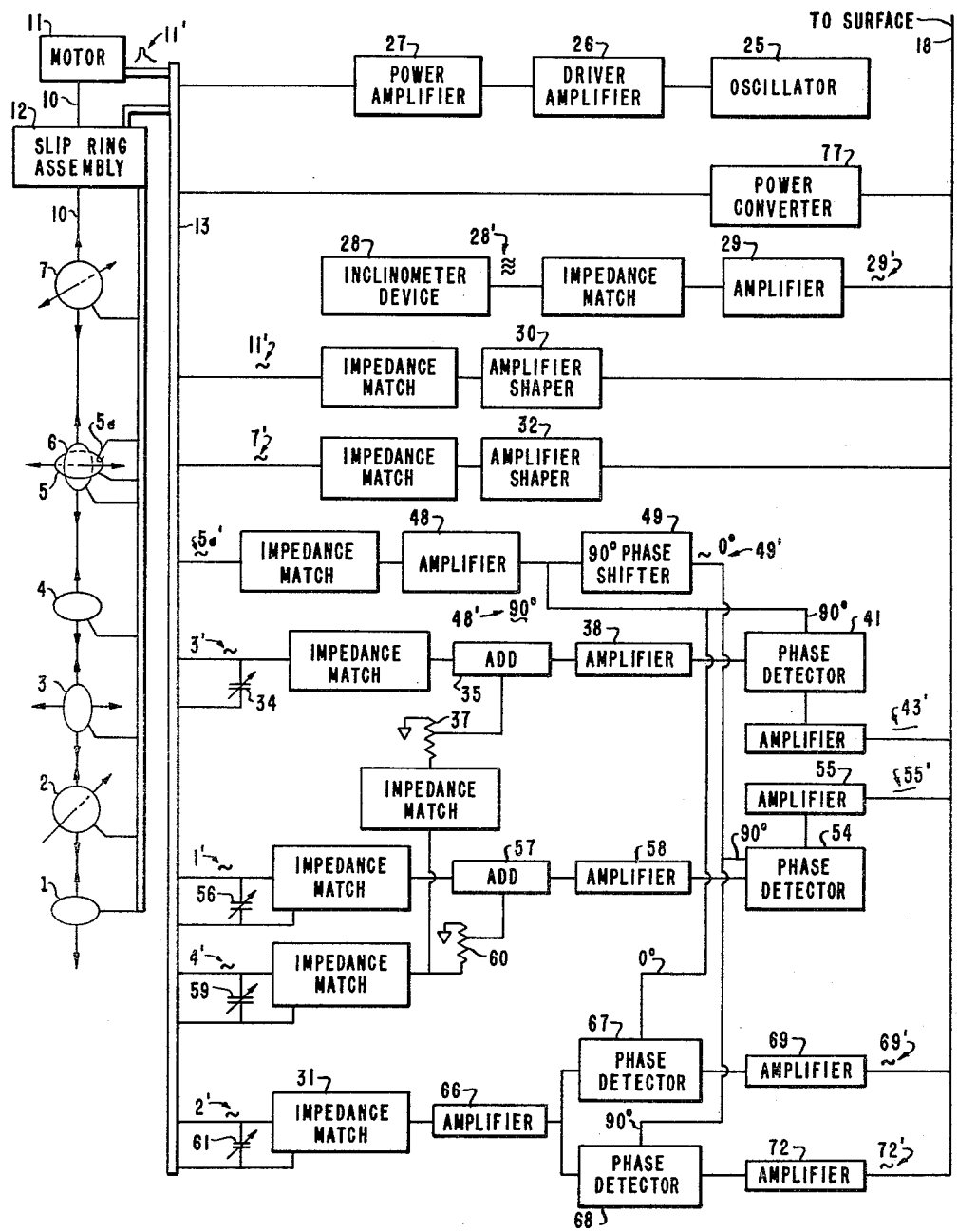
FIGURE 2 is a block diagram of one embodiment of a logging instrument shown in FIGURE 1 illustrating how the various signals may be combined to provide the desired signals indicating various characteristics of the formation.

Reference may now be made to FIGURE 2. Electrical power is preferably supplied from the surface through logging cable 18 to power converter 77 which furnishes the particular power needs of the various electrical and electronic components disposed within the tool. Power leads and connections from converter 77 are not shown in FIGURE 2 for the sake of clarity but are well known to those skilled in the art.

The various coils 1–7 are shown schematically with double-ended arrows indicating their respective and preferred orientation of axes. The coils are fixedly positioned and spaced on shaft 10 and the entire coil assembly, hereinafter referred to as the detecting head, is caused to radially scan the borehole about the borehole axis by motor means 11. A suitable signal or pulse 11' from motor means 11 is connected to amplifier shaper 30 and then coupled to cable 18. Said pulse from motor means 11 may be generated for instance by a pick up coil and a rotating bar magnet attached to shaft 10 and said pulse therefore occurs in some fixed phase relationship to the position of shaft 10. Other means of generating said pulse are well known in the electronics art and will not be discussed further here and the pulse is referred to hereinafter as the motor reference pulse or signal. Because of the scanning means 11, there is generated a scanning motion in magnetic compass coil 7. Coil 7 is disposed on shaft 10 with its axis preferably perpendicular to the instrument axis. The signal obtained from coil 7 is proportional to the horizontal component of the earth's magnetic field and said signal 7' is coupled to amplifier-shaper 32 and then coupled to cable 18 and is referred to hereinafter as the compass pulse or signal. The purpose and utilization of the motor pulse and the compass pulse signals are more fully described hereinafter. The inclinometer device 28 suitably detects the angle between the zenith and the tool axis, hereinafter called drift angle, and also detects the azimuthal direction of drift angle with respect to motor pulse signal 11'. The inclinometer signals 28' are suitably amplified in amplifier 29 and coupled to logging cable 18. Utilization of motor pulse, compass pulse and inclinometer signals are more fully described hereinafter, said utilization being made preferably in the surface equipment.

There are disposed on shaft 10 two source coils; vertical source coil 5 and horizontal source coil 6 whose axes preferably are mutually perpendicular with the vertical source coil axis preferably being parallel with the tool axis. Source coils 5 and 6 are suitably driven from power amplifier 27 that is driven by driver amplifier 26 coupled to an audio or radio frequency source 25. Source coils 5 and 6 furnish the electromagnetic fields which penetrate the surrounding formations and which are utilized to generate the desired detected signals through the particular coil and circuitry arrangement hereinafter described more fully. In the present embodiment source coils 5 and 6 are driven at the same frequency from the common oscillator source 25. Therefore the currents and voltages obtained in the source coil 5 will be at the same frequency as those obtained in the source coil 6 and will also be in some fixed electrical phase relation with those of source coil 6. There is disposed in close proximity to source coil 5 a current pick up coil 5a whose induced signal bears some fixed electrical phase relation with the current of source coil 5. The current signal 5a' referred to hereinafter as the 90° reference signal is amplified in amplifier 48 and suitably coupled to phase detectors 41, 54 and 68. Amplifier 48 is also suitably coupled to phase shifter 49 whose ouput 49', referred to hereinafter as the 0° reference signal, is coupled to phase detector 67. It is to be noted that a suitable reference signal can be obtained by voltage coupling to the source coil 5, for instance, with a suitable transformer. It is further noted that a suitable reference signal can be obtained by suitable coupling anywhere into the source coil circuit, for instance, between oscillator 25 and driver amplifier 26.

There is disposed on shaft 10 a dip detector coil 2 whose axis is preferably oriented perpendicular to both the vertical source 5 axis and the horizontal source 6 axis. Coil 2 is spaced in fixed relation with respect to the vertical source 5. It can be shown mathematically that the induced signal in coil 2, when the tool is disposed in a borehole opposite a dipping, homogeneous, electrical, anisotropic formation due to the arrangement of coil 2 and coil 5 and because of the scanning motion due to scanner means 11 will be an electrical signal, the frequency of which is the same as that of oscillator 25 and will be a signal containing several new and particular and desirable characteristics. As a result of the scanning motion, the said signal will be both amplitude modulated at the frequency of the scanner means and phase modulated at the frequency of the scanner means. The induced signal 2' from coil 2 is coupled to tunable condenser 61 and to amplifier 66. There is shown also an impedance matching device 31, for example a cathode follower circuit, the design and purpose of which is well known to the electronics art. The output of amplifier 66 is suitably coupled to two phase detectors 67 and 68. Phase detector 67 is also coupled to 0° reference signal 49' and phase detector 68 is also coupled to 90° reference signal 48'. The phase detectors herein referred to are devices which detect that component of input signal which has the same (or 180°) electrical phase and frequency as the reference signal that the particular phase detector is operating from. Moreover, the output signal from such a phase detector is a signal whose amplitude is proportional to the amplitude of that detected signal component of the total input signal, whether said amplitude is constant or varying. Therefore the output signal from phase detector 67 which is coupled to amplifier 69 and then to the logging cable 18 is a signal whose amplitude varies in proportion to the amplitude variation of that 0° component of signal contained in the total signal input from amplifier 66. Similarly the signal output from phase detector 68 is coupled to amplifier 72 and then to the logging cable 18. The circuit action is the same as described above except that phase detector 68 is operating from a 90° reference signal and output signals are in proper phase correspondence with this reference.

The outputs from amplifiers 69 and 72 are correspondingly two signals 69' and 72' which signals are varying at a frequency equal to that of the scanner means and whose amplitudes are proportional to formation dip angle and whose electrical phases relatable to motor pulse 11', compass pulse 7' and inclinometer signals 28' are proportional to the azimuthal direction of dip. These signals are also, of course, directly relatable to that direction 90 degrees shifted from the direction of dip and known commonly as formation strike direction. The individual electrical phases between signals 69' and 72' may also be compared, for instance in the surface equipment, in phase detector 78 FIGURE 1. The phase difference between the two signals 69' and 72' is proportional to formation horizontal conductivity anisotropy. Formation horizontal conductivity anisotropy is defined as the ratio of the maximum formation conductivity in a particular direction lying in the bedding plane of the formation to the minimum formation conductivity in some other particular direction lying in the same bedding plane of the formation. The latter direction of minimum formation conductivity is usually considered as being perpendicular to the aforementioned maximum direction.

A formation horizontal conductivity anisotropy can be produced by a preferred orientation of elongated discontinuities in materials within the bedding planes of the formation. In numerous exploration and production activities, it is important to be able to measure the direction of the maximum formation conductivity in the bedding plane of the formation.

In sands which contain elongated grains that were deposited by flow streams, e.g., streams of water or air, the surfaces of the sand grains comprise elongated discontinuities in the materials within the bedding planes of the sand formations, and the sand grains can have a preferred orientation parallel to the direction from the stream from which they were deposited. In such sands the azimuthal direction of the maximum formation conductivity in the bedding plane of the sand usually correlates with the azimuthal directional trend of the sand formation. In addition, where the interstices between such sand grains are filled with fluid or with fluid-permeable materials, the azimuthal direction of maximum fluid transmissibility within the sand formation is usually parallel to the direction of maximum formation conductivity in the beddng plane of the sand. Further, other earth formations, such as limestone formations, contain interconnected pores or fissures, the boundaries of which comprise elongated discontinuities of materials within the bedding planes of the formation; and when there is a preferred orientation of such discontinuities, the azimuthal direction of maximum formation conductivity in the bedding plane is parallel to the direction of maximum fluid transmissibility within the formation. Furthermore, the direction of maximum formation conductivity in the beddng plane of the formaton can provide information of value, for example, in choosing the location for a well intended to encounter a sand which was previously encountered. In choosing the location for fluid injection or production wells intended to take advantage of a direction of maximum fluid transmissibility within a particular reservoir formation.

It is therefore evident, by careful camparison of the respective phases of signals 69' and 72' with the reference phased pulses from motor means, compass coil, inclinometer device and dip signals, that it is possible to determine the orientation of elongated discontinuities.

Figure 4A:
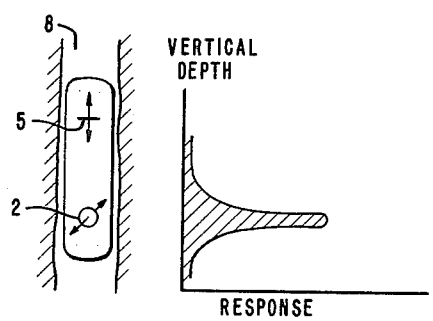
FIGURE 4a and 4b are geometrical plots of so-called instrument response to various volumes of the formations penetrated by the borehole.
Figure 4B:
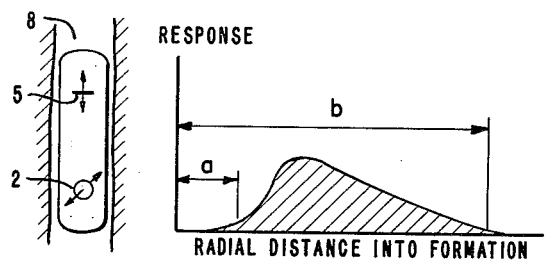

Finally it further can be shown mathematically, because of the arrangement of circuitry and arrangement of source coil 5 and detector coil 2, that the induced signals in detector coil 2 result essentially from a particular volume of formation adjacent to the tool. Such a result is usually discussed along with instrument resolution. Therefore, it is further shown that the tool has a vertical and radial resolution or investigation pattern as illustrated in FIGURE 4. Because of the arrangement of coils and circuitry, the vertical resolution of such an arrangement is very good. For instance, as shown in FIGURE 4a, the tool essentially is not sensitive to the medium above or below that shown in the shaded area. The tool is sensitive to a relatively thin, relatively well defined "pancake" type volume of the surrounding formation. It is further shown in FIGURE 4b, that the tool essentially is not sensitive to the medium of the borehole, bore wall or that region in the vicinity of the bore wall. The tool is sensitive to a volume of formation removed from the borehole, a sort of "doughnut shaped" volume. The radial positions of the regions "a" and "b" shown in FIGURE 4b can be controlled by the source coil 5-detector-coil-2 spacing and by the oscillator 25 frequency. The magnitude of the response shown in both FIGURE 4a and 4b is a function of the conductivity, conductivity anisotropy, and dip characteristics of the formation penetrated.

It should be noted also that the arrangement and circuitry so far disclosed is sufficient to practice that part of the invention which has been described hereinabove, namely detection of formation dip magnitude and strike and formation horizontal conductivity anisotropy.

There are shown in FIGURE 2 two conductivity coils 1 and 4 disposed on shaft 10. The axes of coils 1 and 4 are preferably mutually parallel and parallel to the vertical source coil 5 axis. The two coils are spaced in fixed relationship with source coil 5. In can be shown mathematically that if the two induced signals from coils 1 and 4 are suitably added the resultant or net signal amplitude is proportional to the formation bedding conductivity or formation horizontal conductivity. Therefore, the induced signals from coils 1 and 4 are respectively coupled to tunable condensers 56 and 59. The signal from coil 4 is further coupled through a variable resistor 60 to an adder circuit 57 whereby the adjusted signal from coil 4 and the signal from coil 1 are added in electrical opposition. If the three electrical components, tunable condenser 56, tunable condenser 59, and variable resistor 60, are carefully adjusted, for instance, with the detection head suspended in an air medium there will be no net signal in the output of adder 57 because the two respective signals from coil 1 and coil 4 will have been equalized or nullified in adder 57. However, when the detection head is placed in a borehole penetrating an earth formation there will result a net signal in the output of adder 57 whose amplitude is proportional to formation horizontal conductivity and whose phase relationship is essentially in phase with the 90° reference signal. Therefore, the signal output of adder 57 is amplified in amplifier 58 and suitably coupled to phase detector 54. As previously described above, the output signal from phase detector 54 is a signal whose amplitude is proportional to the amplitude of the 90° component of signal contained in the input signal to phase detector 54. The signal from phase detector 54 is then amplified in amplifier 55 and coupled to logging cable 18.

Because of the particular arrangement of source coil 5 and detector coils 1 and 4 and the circuitry arrangement, the net signal obtained in the output of amplifier 55 is essentially insensitive to the medium of the borehole, the bore wall, or the formation in the immediate vicinity of the bore wall. Such a characteristic is usually referred to as instrument resolution or instrument investigation pattern and can be illustrated as similar to that shown in FIGURE 4. In FIGURES 4a and 4b, if the coil 2 is imagined replaced by the two coils 1 and 4 maintained in their respective fixed relationships with source coil 5, there will result the response patterns as shown in FIGURES 4a and 4b, which have been described previously above. The radial positions of the regions "a" and "b" may be controlled or shifted by changing source frequency or by shifting the fixed spaced relationships between source coil 5 and detector coils 1 and 4, maintaining their respective axes mutually parallel. A third or more additional conductivity coils can be added in different spaced relationships with source coil 5 and detector coils 1 and 4, maintaining their respective axes mutually parallel, such that with additional but similar circuitry, other particular and different volumes of formation can be simultaneously investigated.

Finally it should be noted also that the arrangement of source coil 5 and detector coils 1 and 4 and any additional similarly oriented but differently spaced detector coils and the arrangement of associated circuitry as disclosed immediately above can be utilized solely and separately to determine formation conductivity as hereinabove described.

There is shown in FIGURE 2 a transverse conductivity anisotropy coil 3 disposed on shaft 10. The axis of coil 3 is preferably oriented parallel with the horizontal source coil 6 axis whose axis is oriented preferably perpendicular to the tool axis. The coil 3 is disposed on shaft 10 in a fixed and spaced relationship with horizontal source coil 6. It can be shown mathematically that if the induced signal from coil 3 is suitably combined with other signals available within the tool, for instance with the signal from coil 4, the resultant or net signal amplitude is proportional to formation transverse conductivity anisotropy. Formation transverse conductivity anisotropy is defined as the ratio of conductivity perpendicular to formation bedding planes to that conductivity within the formation bedding planes. The latter conductivity has been defined as formation horizontal conductivity. It is noted also that the induced signal from coil 3 can also be combined suitably, for instance, with the 0° reference signal obtained from phase shifter 49 output to produce a net signal whose amplitude is proportional to formation vertical conductivity anisotropy. This would eliminate the need for coil 4 insofar as transverse conductivity anisotropy measurements are concerned and will be more fully described hereinafter. In FIGURE 2 the induced signal from coil 3 is illustrated as coupled to tunable condenser 34 and also coupled to adder circuit 36. The induced signal from coil 4 is coupled through variable resistor 37 to the same adder circuit 36 with the two input signals to adder circuit 36 being added in electrical opposition. If the tunable condenser 34 and variable resistor 37 are carefully adjusted, for instance, with the detection head suspended in an air medium there will be no net signal in the output of adder circuit 36, because the two respective signals from coil 3 and coil 4 will have been equalized. However, when the detection head is placed in a borehole penetrating an earth formation possessing the characteristic of transverse conductivity anisotropy there will result a net signal in the output of adder 36 whose amplitude is proportional to formation transverse conductivity anisotropy and whose phase relationship essentially is in phase with the 90° reference signal. Therefore the signal output of adder 36 is coupled to amplifier 38 and then coupled to phase detector 41, the output signal of which is coupled to amplifier 43 and then coupled to the logging cable 18. As hereinabove described the output from phase detector 41 is a signal whose amplitude is proportional to the amplitude of that 90° component of signal contained in the input signal to phase detector 41. Phase detector 41 is operating from a 90° reference signal.

Furthermore, it is to be noted that the formation transverse conductivity anisotropy is a property unique to an individual formation, and it is a property which may be different in each of several formations which exhibit substantially identical resistivity or conductivity properties in respect to the conventional procedures for measuring resistivity or conductivity. By measuring the variations with depth of the formation transverse conductivity anisotropy of the formations encountered in different wells, it is therefore possible to detect or vertify whether a formation encountered at one depth in one well is the same formation which is encountered at a different depth in a different well.

It is noted that horizontal source coil 6 and detector coil 3 and associated circuitry can be utilized solely and separately to determine formation transverse conductivity anisotropy or said coils can be used together with vertical source coil 6 and at least two horizontal conductivity detector coils 1 and 4 and associated circuitry to result in an improved measurement or a more accurate measurement of formation transverse conductivity anisotropy since the formation transverse conductivity anisotropy signal obtained from the utilization of horizontal source coil 6 and detector coil 3 is somewhat dependent on the magnitude of formation horizontal conductivity. If utilization is made of the improved measurement of formation transverse conductivity anisotropy, the relationship of the dependence of said anisotropy signal on the magnitude of formation horizontal conductivity can be accurately computed from mathematical formulas or the relationship can be determined experimentally. In any case such comparison or computation can be done manually or automatically computed for instance at the surface by the logging engineer or by surface computing equipment. Utilization of both the formation horizontal conductivity signal amplitude from amplifier 55 and the formation transverse conductivity anisotropy signal amplitude from amplifier 43 can be made in conjunction with the signal amplitude from either amplifier outputs 69 or 72 to obtain a more accurate measure of formation dip magnitude since the amplitude of signals 69' and 72' are somewhat affected by the magnitude of formation horizontal conductivity and formation transverse conductivity anisotropy. Such comparison can be made accurately based on mathematical computation, for instance at the surface, by the logging engineer or by suitable computing circuitry or by empirical and experimental methods.

The above-described arrangement of coils and associated circuitry provides the following signals that are fed to the logging cable and transmitted to the surface for suitable recording on recorder 22:

(1) A motor phase reference signal 11' that allows determination of the instantaneous position of shaft 10 with respect to a fixed reference in the tool.

(2) A compass phased reference signal 7' that allows determination of the position of shaft 10 with respect to the earth's horizontal magnetic field.

(3) Inclinometer signals 29' the amplitude of which is proportional to drift angle magnitude of the tool disposed in the borehole and the phase of which is proportional to the azimuthal direction of drift angle related to a fixed reference in the tool.

(4) A signal 43' whose amplitude is a function of formation transverse conductivity anisotropy and is somewhat dependent on the magnitude of formation horizontal conductivity.

(5) A signal 55' whose amplitude is a function of formation horizontal conductivity.

(6) Two separate signal 69' and 72' whose amplitudes are a function of formation dip angle magnitude and whose amplitudes are somewhat dependent on the magnitudes of (4) and (5) above, and the phase of one or the other with respect to the motor phased reference signal is an indication of direction of formation dip with respect to a fixed reference in the tool.

(7) Furthermore the phase difference between the two signals 69' and 72' is proportional to formation horizontal conductivity anisotropy and measurement of this said phase with respect to the motor phased reference signal inclinometer signals and dip signal results in a signal indication of the direction of maximum or minimum conductvity within the formation bedding plane.

Figure 3:
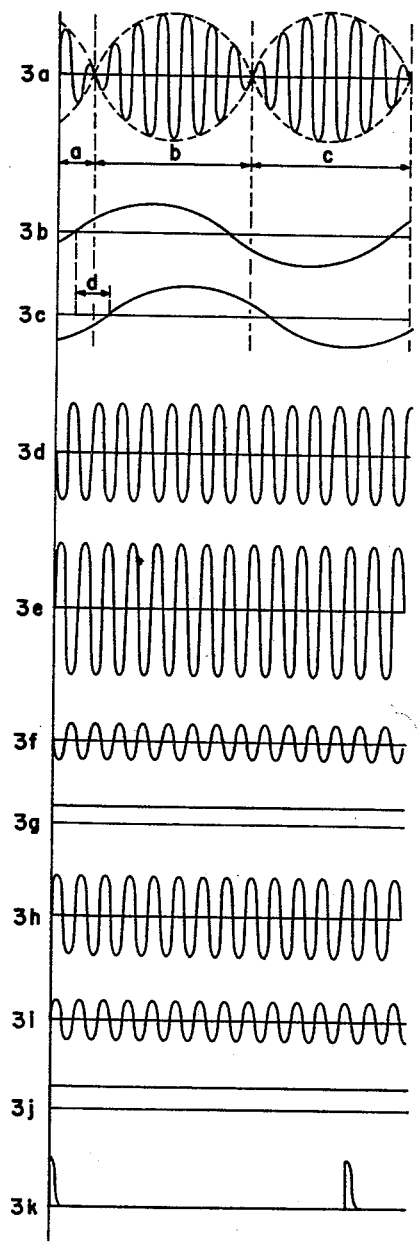
FIGURE 3 is a series of wave forms illustrating the signals obtained in the various portions of the circuits shown in FIGURE 2.

In FIGURE 3 are shown certain of the signals as they occur in the circuitry of FIGURE 2. FIGURE 3a is representative of the amplitude modulated signal 2' illustrating a zero cross over which is in some particular time relation "a" with motor pulse 11' shown in FIGURE 3k. Region "b" is also indicated to be electrically phase shifted from region "c" by approximately 180 degrees. Specifically the signal shown in FIGURE 3a is composed of two amplitude modulated signals which are in electrical phase quadrature, namely a 0° phased component and a 90° phased component. Said components are phase detected in phase detectors 67 and 68 and the illustrates 3b and 3c show the respective detected signals which are the outputs respectively of phase detector 67 and phase detector 68. There is also illustrated a relative phase shift (d) between FIGURES 3b and 3c indicating formation horizontal conductivity anisotropy which relative phase is relatable to the direction of maximum or minimum horizontal conductivity.

FIGURE 3d illustrates the signal 1'; FIGURE 3e illustrates the signal 4' and FIGURE 3f illustrates their difference in the presence of a conducting formation. FIGURE 3f is considered in phase with the 90° reference phase of phase detector 54 and FIGURE 3g is therefore the detected output of phase detector 54.

Similarly, FIGURE 3h illustrates the signal 3' and FIGURE 3i illustrates the difference obtained in adder 36 in the presence of a formation possessing a transverse conductivity anisotropy. FIGURE 3i is considered in phase with the 90° reference phase of phase detector 41 and FIGURE 3j is therefore the detected output of phase detector 41.

It is recognized that although the plurality of coils shown in FIGURE 2 are considered in fixed geometrical relationship with each other, certain changes in their relationships may occur, for instance, due to temperature effects which can warp or change the orientations of the respective coil axes. Therefore reference is made to FIGURE 5 whereby certain additional circuitry has been added which effectively eliminates errors occurring in the induced signals from the various detector coils due to any uncontrolled changes in their respective orientation. Furthermore, the circuits in FIGURE 5 eliminate the need for the particular or precise positioning or orientation of the various detector coils and in addition effectively result in a so-called null-balancing detection circuitry.

Figure 5:
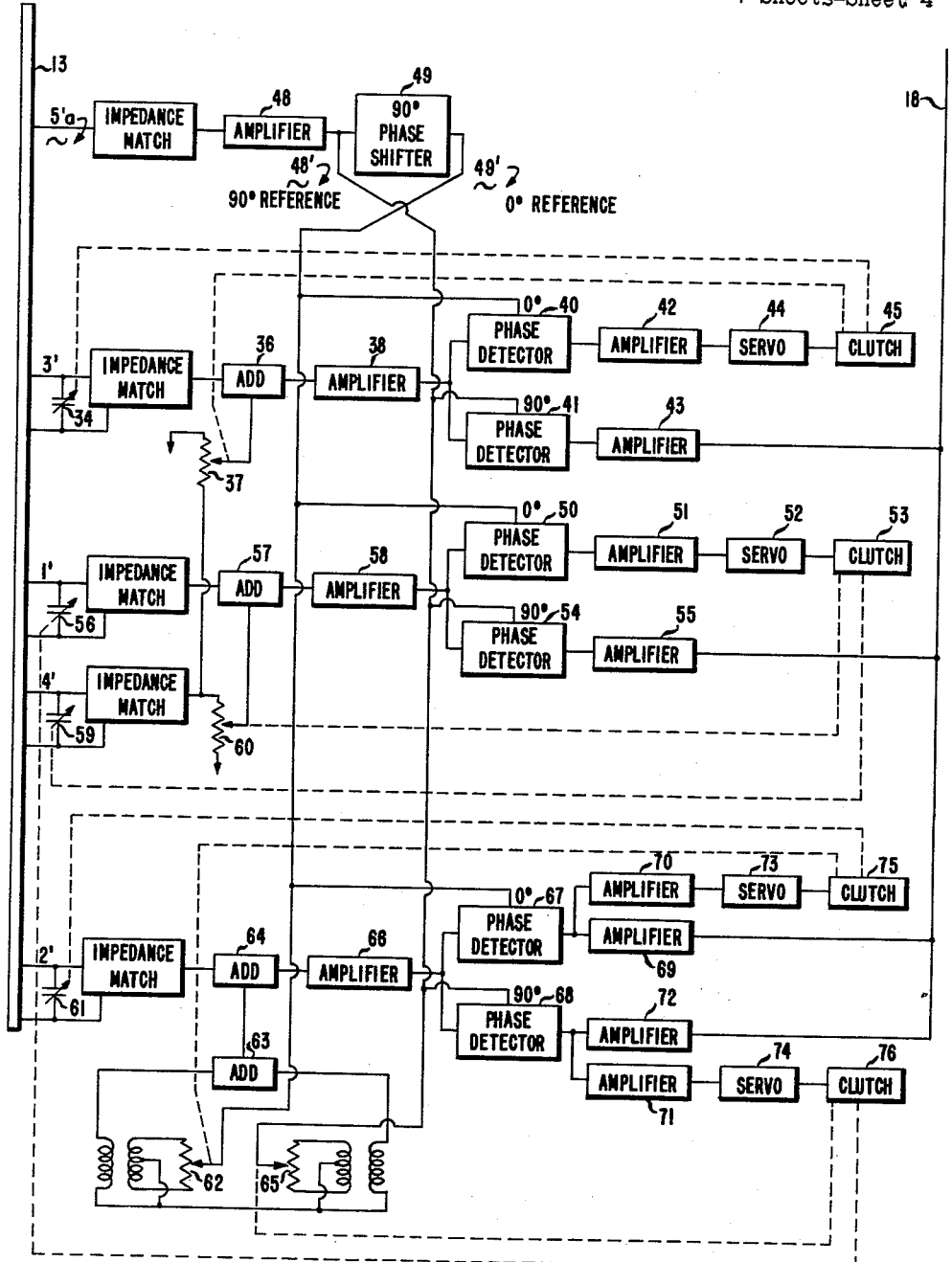
FIGURE 5 is a block diagram of another embodiment of a logging instrument shown in FIGURES 1 and 2.

Reference is now made to FIGURE 5 wherein the additional circuitry has been shown in conjunction with that disclosed in FIGURE 2. It is understood that the circuitry of FIGURE 2 may be modified as shown in FIGURE 5 to provide improved accuracy. Of course, the circuits shown in FIGURE 2 provide useful results and may be used without the modifications shown in FIGURE 5. It has been noted that in the presence of a dipping homogeneous, electrically anisotropic formation the induced signal 2' from coil 2 is an amplitude modulated signal whose basic or carrier frequency is that of the oscillator 25 of FIGURE 2 and whose amplitude modulation frequency is that of the scanning means 11 of FIGURE 2. If the coil 2 axis orientation becomes misaligned for any reason, there will be another signal induced in coil 2 which signal is hereinafter called error signal and is due principally to direct coupling of source coil 5 with detector coil 2. For instance, such direct coupled signals can be observed when detector coil 2 is purposely misaligned and when the detection head is suspended in an air medium. It is noted, therefore, that such direct coupled signals or error signals are not modulated by the motion of the scanner means but appear in the output of coil 2 as so-called steady signals of the frequency of the oscillator and do not exhibit periodic amplitude modulation as do those signals induced via a dipping formation. Consider, therefore an induced signal in coil 2 which is composed of an error signal and a formation signal: the error signal is considered as a steady signal of constant amplitude, varying only when the coil axis orientation is changed; the formation signal is an amplitude modulated signal resulting from a homogeneous, electrically anisotropic, dipping earth formation surrounding the detection head. The total signal is now coupled through adder 64 to amplifier 66 that is suitably coupled respectively to the two phase detectors 67 and 68. The output of the phase detector 67 is now coupled not only to amplifier 69 but also to amplifier 70 which is coupled to servo unit 73 and to clutch unit 75. The output of phase detector 68 is now coupled not only to amplifier 72 but also to amplifier 71 which is coupled to servo unit 74 and to clutch unit 76. The action of the phase detectors 67 and 68 on the signal output from amplifier 66 is as described above in conjunction with FIGURE 2. However, there now is contained, for instance, in the output of phase detector 67, a D.C. component whose amplitude is proportional to the amplitude of that component of error signal input which has the same electrical phase as the 0° reference phase of phase detector 67. Because of the relatively slow time response of amplifier 70 and servo unit 73, the A.C. component of phase detector 67 output is ignored; however the D.C. component is suitably amplified and coupled as a driving signal to servo unit 73. Servo unit 73 then drives clutch 75 which is adjusted to drive variable resistor 62. The variable resistor 62 is coupled to the 0° reference phased signal and the circuitry and rotation of variable resistor 62 and servo unit 73 is so arranged that, as the servo unit drives the variable resistor 62, a certain amplitude of the 0° phased reference signal is transformer coupled to adder circuit 63 and then coupled back into adder circuit 64 in such a manner that one component of the error signal is added in electrical opposition to produce a null output in amplifier 66 for that particular component. When this occurs there remains no further D.C. component in the output of phase detector 67 and therefore no driving signal to servo unit 73 via amplifier 70. If a further change of induced error signal occurs in the coil 2, the servo 73 loop action effectively removes its effect in a similar manner as described above. The action of phase detector 68 coupled with amplifier 71, servo unit 74 and clutch 76 is similar to that described above except that the action occurs by use of the 90° reference phased signal. Therefore, if there exists a quadrature component or 90° component of error signal in the coil 2 output, this component of error signal is detected in phase detector 68 as a D.C. component which is suitably amplified in amplifier 71 that drives servo unit 74 which drives variable resistor 65 via clutch 76. Variable resistor 65 is suitably coupled to the 90° reference phased signal and the servo loop action is such that a certain amount of 90° reference phased signal is transformer coupled to adder 63 and then coupled to adder 64 such that the other component of the error signal is added in electrical opposition to produce a null output in amplifier 66 for that particular component. When this occurs there remains no further D.C. component in the output of phase detector 68 and therefore no driving signal to servo unit 74 via amplifier 71.

It is thus seen that the circuit of FIGURE 5 maintains the detector coil 2 balanced to error signal, thereby generating a null-detection measurement of the desired formation signal. The term null-detection is significant in that the information signal or the desired formation signal from detector coil 2 must effectively obtain a null, or no signal condition, twice each cycle of the scanner means. This is a significant contribution to electronics maintenance as observed in the surface equipment since mal-functioning components or circuitry is easily detected. Finally, the method of null-balancing effectively produces a self-calibrating circuitry: This procedure essentially assures that the signal obtained from amplifiers 69 and 72 are true representations of the desired signals and are not subject to some predetermined calibration scheme or to drifts of calibration. The use of the clutches 75 and 76 are a convenient means to allow also remote tuning of the respective condensers 61 and 56. Although the servo units here described refer to electromechanical units, it is envisioned that electronic units or photo-electronic units can be utilized to accomplish the same procedure. Such units are well known to the electronics art.

Reference is now made to the horizontal conductivity coil circuit containing detector coils 1 and 4. In this circuit there has been added a phase detector 50, amplifier 51 and servo unit 52 and clutch unit 53. The servo loop action is similar to that described above for the dip coil 2. The induced signals in coil 1 are suitably coupled to adder 57. The induced signals from coil 4 are suitably coupled via variable resistor 60 to the same adder 57. By adjustment of variable condensers 56, 59 and variable resistor 60, the two said signals are added in electrical opposition in adder 57 when, for instance, the detection head is suspended in air medium. There is then no net signal out of adder 57 and therefore no signal input or output from the respective phase detectors 50 or 54, and therefore no driving signal to servo unit 52 via amplifier 51. If the orientation of coils 1 and 4 axes remain fixed there results essentially no servo loop action via servo 52 as the detection head is lowered into a borehole penetrating conductive formations, since the formation horizontal conductivity signal is essentially one of quadrature or 90° electrical phase. However, if for any reason, the orientation of the said axes changes there can result an error signal in adder 57 since the two coil signal magnitudes would not now balance out or electrically add to zero, or null, in adder 57. This error signal will now contain an appreciable "in phase" or "0°" phased component which is amplified in amplifier 58, phase detected in phase detector 50 whose output signal has an amplitude proportional to the amplitude of the in phase component of the error signal. Said signal is suitably amplified in amplifier 51 which now drives servo unit 52 via clutch unit 53 to adjust variable resistor 60 such that a newly adjusted amplitude of the signal from coil 4 may be added in adder 57 such that the error signal due to misaligned or misoriented axes of either coil 1 or coil 4 is effectively nullified. When this circumstance results there will then be essentially no signal output from phase detector 50 and therefore no driving signal to servo unit 52 via amplifier 51.

Therefore, it is seen that the additional circuitry described above in conjunction with the conductivity coils 1 and 4 will balance out or nullify error signal resulting from misalignment or misorientation of either coil 1 or 4 axes.

Reference is now made to the transverse anistropy coil 3. Amplifier output 38 is coupled to phase detector 41 and is also coupled to an additional phase detector 40 which is suitably coupled to amplifier 42 that drives servo unit 44 which is coupled to clutch unit 45. The servo loop action is identical in principle with that described above for the horizontal conductivity coils. Any misalignment or misorientation of coil 3 or coil 4 axes will cause an error signal to occur in adder 36. Said error signal is amplified in amplifier 38 and the "in phase" component of error signal is phase detected in phase detector 40 which drives servo unit 44 via amplifier 42 through clutch 45 to the variable resistor 37 which automatically corrects the amplitude of signal from coil 4 such that the error signal in adder 36 is nullified. Therefore it is seen that the additional circuitry described above and used in conjunction with the detector coil 3 will balance out or nullify error signals resulting from misalignment or misorientation of either coil 3 or 4 axes. The clutch units 53 and 45 allow remote tuning of the variable condensers 34 and 59.

Before further discussion concerning this invention, in order to more fully understand the distinct operations and functions of the various coils and circuits, it is deemed desirable to set forth one possible operational procedure.

Reference is made again to FIGURE 5. The detection head is considered suspended in an air medium, for instance, prior to logging a borehole. Since the surrounding medium is air there will be no formation signal induced in any of the detector coils. Servo units 73 and 74 will nullify any error signals present in adder 64 and a null signal will occur in the output of amplifier 69 and 72 which are observable in the surface equipment, for instance on the recorder 22. A convenient loop of wire with a small resistance inserted therein may then be placed in a tilted position about the detection head in the vicinity of coil 2. There will result a "fictitious formation signal" in adder 64 which is observable in the surface equipment via amplifier outputs 69 to 72. Servo motor means 73 may then be remotely controlled as well as clutch 75 such that condenser 61 may be tuned to resonance. Such circumstance will occur and be observable in the surface equipment, for instance, when amplifier output 69 reaches a maximum. If the "fictitious formation loop" has been adjusted and placed with care about detector coil 2, such resonance circumstance will also occur and be observable in the surface equipment, for instance, when amplifier output 72 is nullified. Finally, the servo units are allowed to control continuously the variable resistors 62 and 65 preparatory for logging.

In order to prebalance coils 1 and 4 servo units 74 and 52 via clutches 74 and 53 can be remotely controlled to tune coils 1 and 4 to resonance by adjusting respectively condensers 56 and 59 and in conjunction with suitable adjustment of variable resistor 60, such balance and tuning circumstance occurs and is observable in surface equipment when the amplifier 55 output is nullified. Finally, the servo units are allowed to control continuously their respective variable resistors preparatory to logging.

In order to prebalance coils 3 and 4, servo unit 44 and clutch 45 are remotely controlled to tune the coil 3 circuit to resonance by adjustment of condenser 34 and in conjunction with suitable adjustment of variable resistor 37, such balance and tuning circumstance occurs and is observable in surface equipment when the amplifier 43 output is nullified. Finally, the servo unit is allowed to control continuously the variable resistor 37 preparatory to logging.

The logging tool is now suitably adjusted and will now suitably log the formation penetrated by a borehole and will produce the desired signals hereinabove described.

Figure 6:
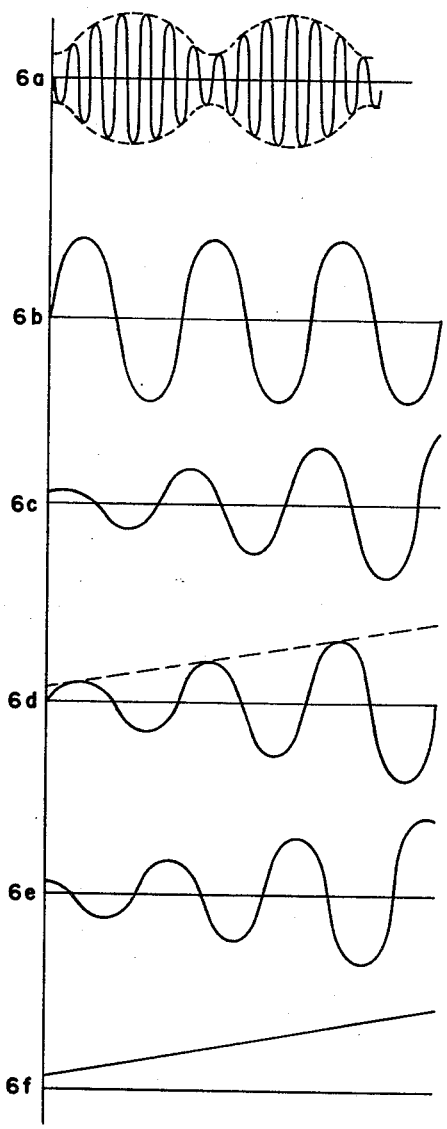
FIGURE 6 is a series of wave forms showing signals obtained in certain portions of the circuit of FIGURE 5.

FIGURE 6a illustrates the induced signal 2' obtained when there is present an error signal as well as formation dip signal. FIGURE 6b and following are expanded views tending to illustrate the operation of a phase detector. FIGURE 6b represents the reference phase for instance the 0° reference phase signal. FIGURE 6c represents the total signal input after servo action has eliminated the error signals; FIGURES 6d and 6e represent the two quadrature components of total signal; FIGURES 6c and 6d being in phase with reference signal; FIGURES 6b and 6e being in quadrature relationship to reference signal FIGURE 6b. FIGURE 6f represents the detached output of a phase detector operating on reference phase FIGURE 6b with input FIGURE 6c. There is seen an output in FIGURE 6f which is proportional to the amplitude of FIGURE 6d.

Finally, it is recognized that although the improved circuitry as described above in conjunction with FIGURE 5 is a self-calibrating-null-reading instrument, generating the desired signals as hereinabove described, there remains one possible source of error which, under certain circumstances hereinafter more fully described, may not be removed or compensated by the above circuitry. This source of error may result from changes of tuning in the respective detector coil circuits due for instance, to temperature effects on either the coil inductance or component capacitance. Specifically, such errors if they occur may be principally observed in the detection circuitry associated with the conductivity coils 1 and 4 and the vertical conductivity anisotropy coil 3. Small shifts of tuning in the dip coil 2 circuit of the order of those to be expected due to temperature effects on coil 2 inductance or condenser 61 do not appreciably affect the resultant detected signal outputs of amplifiers 69 and 72. Moreover, any such tuning shift if it becomes significant for other reasons, for instance, a mal-functioning component, is readily detectable by mutual comparison of the amplitude of the two signals obtained from amplifiers 69 and 72, which bear a known and fixed relationship with each other dependent on dip magnitude and formation conductivity.

Figure 7:
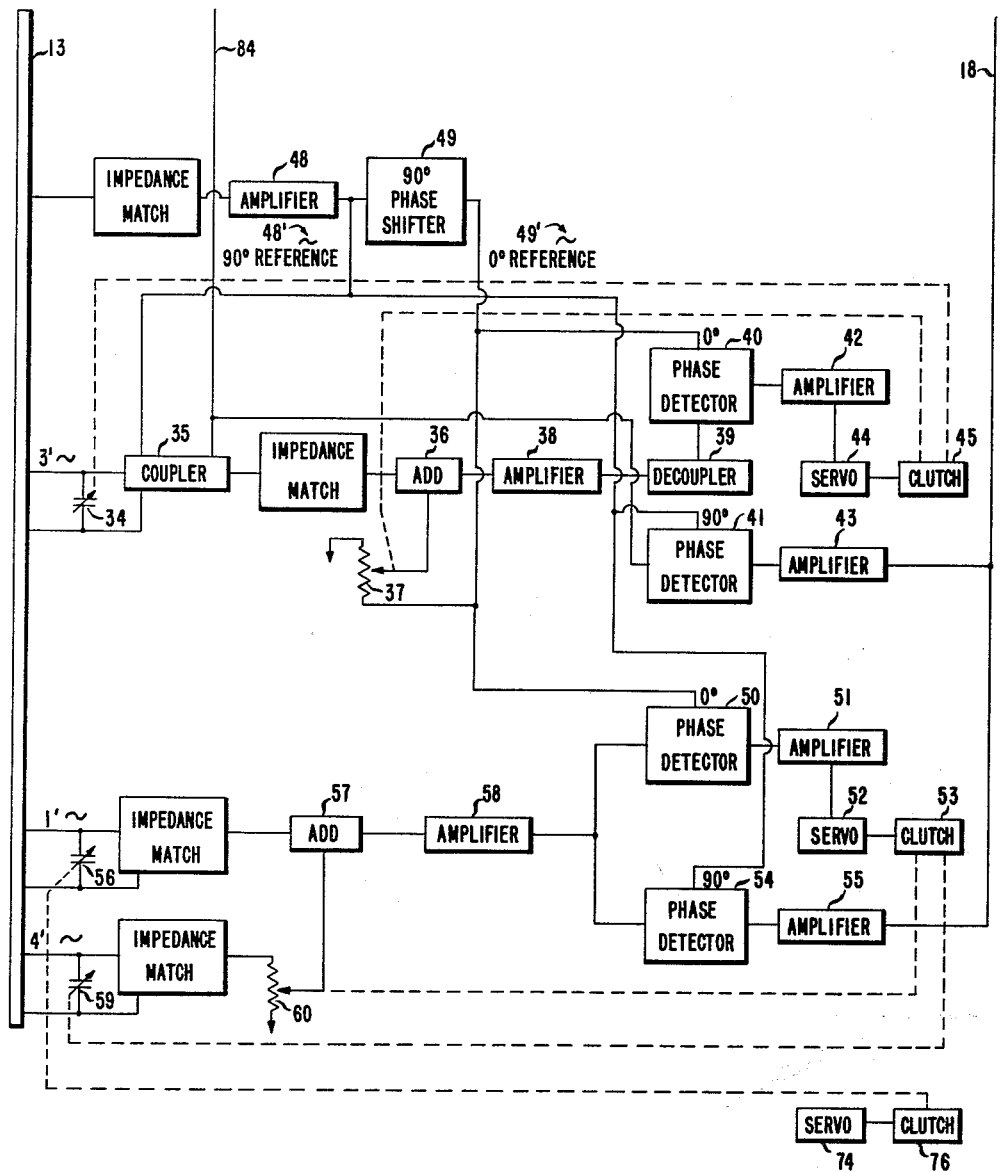
FIGURE 7 is a block diagram of another embodiment of a logging instrument shown in FIGURES 1 and 2.

In order to eliminate the possible effects of tuning changes in the coil circuits 1, 3 and 4, certain changes in circuitry and operational procedure can be made. Reference is now made to FIGURE 7 that shows only those circuits which are affected. It is to be understood that other circuitry although not shown is present and functions as previously described. Consider that the detection head is suspended in air medium and refer to the conductivity coil circuits of FIGURE 7. By remote control of servo unit 74 and clutch unit 76, the detector coil 1 circuit may be tuned by changing tunable condenser 56 to some value off resonance, for instance 7 or 8 degrees of electrical phase shift from that obtained at resonance. The servo unit 74 and clutch unit 76 are then allowed to control in their normal manner as disclosed above in conjunction with FIGURE 5. The detector coil 4 circuit may also be tuned by changing tunable condenser 59 by remote control of servo unit 52 and clutch unit 53. Servo unit 52 through clutch unit 53 may also be used alternatively to vary resistor 60 such that a null signal is obtained in adder 57. Such condition will result in null output signals from phase detectors 50 and 54 and can be observed in the surface equipment as a null output from amplifier 55. If the servo unit 52 through clutch 53 is now allowed to continuously control condenser 59 instead of resistor 60 there are obtained several significant advantages. Specifically, any further changes in the tuned circuits of coil 1 or 4 or small changes of their assumed aligned axes due for instance to temperature effects will automatically be compensated by the servo loop action on condenser 59. This condition of automatic balancing and tuning occurs and the net signal obtained under borehole conditions of temperature and pressure will be maintained providing the coils 1 and 4 are held in reasonably fixed alignment, a circumstance obtainable for instance with epoxy resin bases for coil supports and providing the coils 1 and 4 are reasonably similar with respect to their inductances and "Q." Directly dependent on the exactness of the similarity between the coils, the oscillator frequency may be varied several hundredths of a percent in the radio range of frequencies without undue effect or errors being generated in the detection circuitry, so that no unreasonable requirements are placed on oscillator stability.

Referring again to FIGURE 7, there is shown the modified circuit for use with coil 3 to eliminate the possible effects of tuning changes. The induced signal 3' from coil 3 is coupled as before to tunable condenser 34. There has been added a coupler 35 which periodically introduces into the tunable circuit of coil 3 a so-called "swamping" signal from the 90° reference phased signal. The signal output from coupler 35 now consists of the induced signal from coil 3 and a larger 90° reference phased signal periodically superimposed thereon with the output signal coupled through adder 36 and through amplifier 38 to decoupler 39. Decoupler 39 and coupler 35 are synchronized together by suitable power from bus 84 such that the periodically imposed 90° reference phased signal is coupled to phase detector 40 while the remaining portion, namely the induced signal 3' of coil 3, is coupled to phase detector 41.

Consider that the detection head is suspended in an air medium. Since there is no formation present, the signal induced in coil 3 can be considered as error signal. This induced signal is actually that signal which is induced by direct inductive coupling with the horizontal source coil 6. Therefore, the electrical phase of said error signal is essentially that of the 0° reference phased signal providing that the coil 3 is tuned to resonance. Provision has been made via variable resistor 37 to introduce into adder 36 a certain amount of suitably phased 0° reference phased signal such that the said error signal is nullified. The cancellation or nullification occurs in the adder because the two said signals are added in electrical opposition.

The operational procedure can be envisioned as follows. Clutch unit 45 is remotely controlled such that servo unit 44 controls adjustable resistor 37. The error signal induced in coil 3 from horizontal source coil 6 will be a signal whose electrical phase is principally that of the 0° reference phased signal. This is strictly true if the coil 3 circuit is tuned to resonance and is approximately true when the coil 3 circuit is not tuned to resonance, since the variable condenser 34 has only a limited range of tuning. The servo loop action on resistor 37 will be such that the adder 36 output will be nullified insofar as the induced error signal in coil 3 is concerned. The clutch unit 45 can now be remotely controlled such that servo unit 44 controls tunable condenser 34. Furthermore, the coupler 35 is now allowed to introduce the swamping 90° reference phased signal which signal is electrically phase shifted by the coil 3 tuned circuit if said tuned circuit is not resonant. This is equivalent to saying that there will be generated in the coil tuned circuit a component of 0° phased signal if the said tuned circuit is not tuned to resonance, with the generated 0° phased signal being coupled to phase detector 40 via decoupler 39 and the signal output of phase detector 40, amplified in amplifier 42 and coupled to servo unit 44. Via the clutch action 45 the servo unit 44 then adjusts condenser 34 until the tuned circuit of coil 3 is resonant at which time there will remain no signal output from phase detector 40 to drive servo unit 44.

Therefore the system disclosed is truly a null-balancing-automatic tuning detection system whereby the induced signals in coil 3 are balanced with respect to error signals and are continuously controlled with respect to coil tuning such that the signal output from amplifier 43 is proportional to formation transverse conductivity anisotropy and which signal is not affected by tuning changes or small changes in coil positioning or axis orientation.

It is further noted that such an automatic tuning procedure as disclosed above for use with the coil 3 circuit can also be used in any other of the detector coil circuits.

Figure 8:
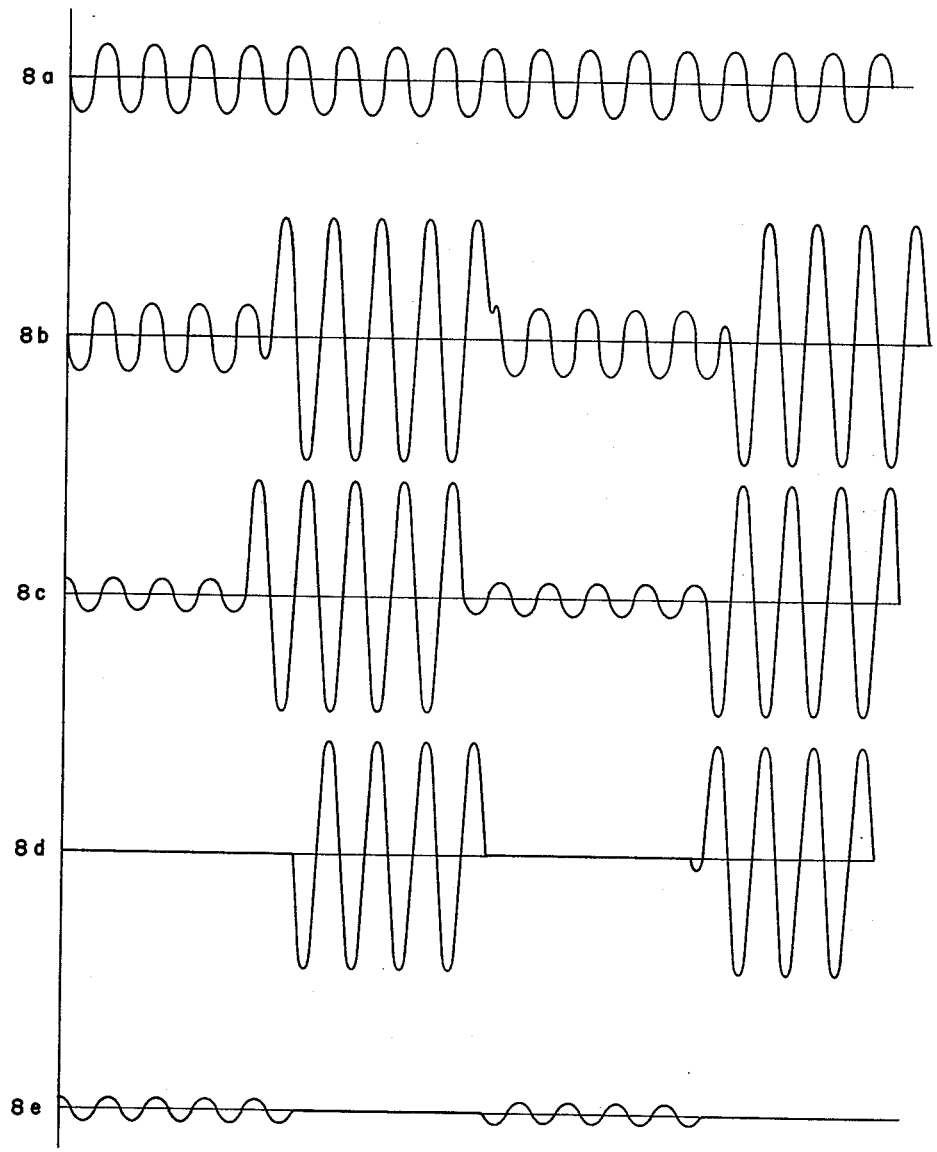
FIGURE 8 is a series of wave forms illustrating the signals obtained in various portions of the circuits shown in FIGURE 7; and, FIGURES 9a–9f are block diagrams of another embodiment of source coil circuitry.

FIGURE 8 illustrates a few of the wave forms occurring in the coil 3 circuitry and are helpful in understanding more clearly how the circuitry functions. FIGURE 8a represents the induced signal in coil 3 and includes both the aforementioned error signal direct coupled from source coil 6 and the formation signal. FIGURE 8b illustrates the action of coupler 35 of FIGURE 7 in periodically adding a large amplitude 90° reference phased signal to the induced signal of coil 3. Said large amplitude signal may be thought of as a tuning signal whereby the tuned circuit of coil 3 is tuned via the adjustment of condenser 34. FIGURE 8c illustrates the output signal of adder circuit 36 whereby the error signal has been removed. Therefore the information part of the signal is reduced as shown. FIGURE 8d illustrates the action of decoupler 39 and illustrates the tuning signal coupled to phase detector 40. FIGURE 8e is indicative of the signal input to phase detector 41 which signal after detection and amplification is a measure of the formation transverse conductivity anisotropy.

FIGURE 9 illustrates another embodiment for the source coil circuitry shown in FIGURE 2 and described above. FIGURE 2 illustrates two source coils 5 and 6 operated from one power amplifier 27, driver amplifier 26 and one oscillator 25. Source coils 5 and 6 can be operated from one lead in series or parallel as illustrated respectively in FIGURES 9a and 9b. Said source coils also can be operated from two separate leads, for instance, as illustrated in FIGURE 9c. Said source coils also can be operated from two separate circuits suitably coupled to one oscillator, for instance as illustrated in FIGURE 9d. Finally, there are certain advantages obtained from the source coil circuits of FIGURE 9e which will be discussed more fully hereinafter. There is shown an audio or radio frequency source 25. By circuits well known in the art of electronics suitable coupling from oscillator 25 can be made to a frequency doubler 86 and to adder 87 for instance. The two frequencies $f_1$ and $f_2$ are suitably amplified in driver amplifier 26 and power amplifier 27 and suitably coupled to the horizontal source coil 6 and vertical source coil 5, for instance as shown in FIGURES 9e and 9f. Source coils 5 may be tuned to frequency $f_2$ and source coil 6 may be tuned to frequency $f_1$ or vice versa. With two frequencies present, the current reference coil 6a similar in purpose to current reference coil 5a is preferably used although not necessary to the practicing of the invention. The circuitry of coil 3 would then be operated at the horizontal source coil 6 frequency $f_1$, the other detector coil circuitry remaining unchanged. The reference signal from current coil 6a would be used in conjunction with the circuitry of coil 3 in an entirely analogous manner preferably with that procedure described in conjunction with FIGURE 7 except operation of the circuits is now considered at a different frequency, $f_1$.

Figure 9A:
Figure 9B:
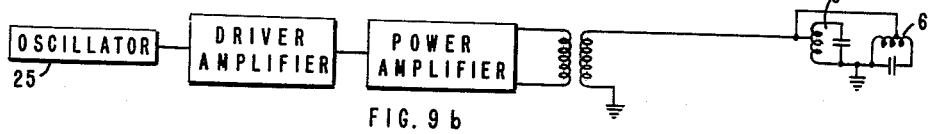
Figure 9C:
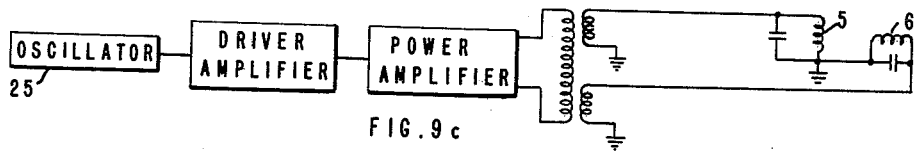
Figure 9D:
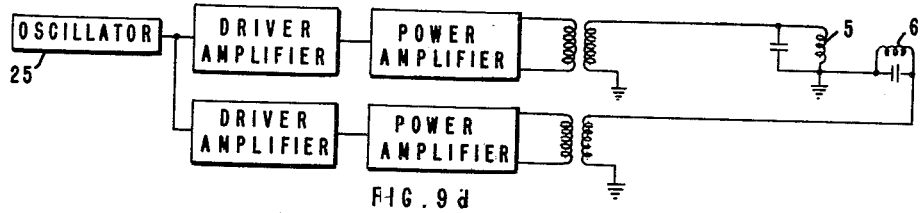
Figure 9E:
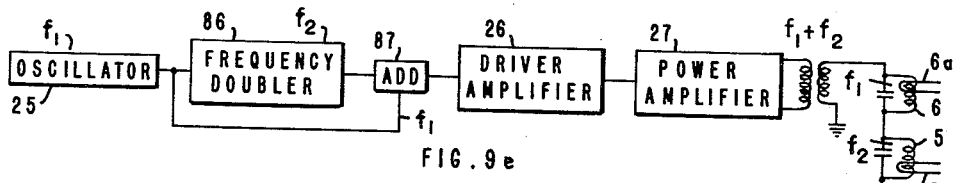
Figure 9F:
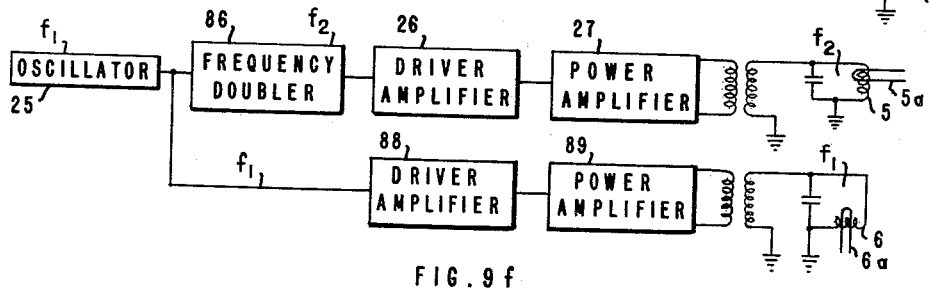

The advantage inherent in such an arrangement of source coil circuitry and frequencies as shown in FIGURES 9e or 9f will become apparent from the following discussion. The scanning means 11 of FIGURE 2 causes a scanning motion in horizontal source coil 6. Said scanning motion may introduce via the surrounding formation certain small amplitude modulated signals into coils 1, 2 and 4. This circumstance may result, for instance, if the axis orientation of horizontal source coil 6 is not suitably adjusted to be mutually perpendicular with the axis orientation of coils 1, 2 and 4. Said small amplitude modulated signals may be removed, for instance, by suitable filtering in the coil 1 and 4 circuits. Suitable filtering is possible but difficult to obtain, however, for the coil 2 circuit. Therefore, the preferred arrangement of the invention utilizes the circuit of FIGURE 9e, having a common oscillator as described above. The preferred arrangement further includes those methods disclosed for automatic tuning discussed in conjunction with FIGURE 7. The preferred arrangement finally includes the null balancing methods as discussed in conjunction with FIGURE 5 for the dip coil circuit.

I claim as my invention:

1. An electromagnetic surveying instrument for use in determining the characteristics of earth formations traversed by a borehole, said surveying instrument comprising: two solenoids, the axis of one solenoid being substantially aligned with the axis of the borehole and the axis of said other solenoid being substantially normal to the axis of said one solenoid; circuit means for coupling a source of alternating current to said solenoids; a first detector coil spaced from said solenoids and having its axis substantially perpendicular to the axis of the borehole and the axis of said other solenoid; a pair of detector coils spaced from both said solenoids and said first detector coil, the axes of said pair of detectors being aligned substantially parallel to the axis of the borehole; a fourth detection coil spaced from both said solenoids and said first and said pair of detector coils and having its axis aligned with the axis of said other solenoid; a support member, said solenoids and detector coils being mounted on said support member in a spaced position; rotation means coupled to said support member for rotating said solenoids and said detector coils in synchronism about an axis substantially parallel with the axis of the borehole, circuit means coupling said detector coils together to form detector coil systems and recording means coupled to said detector coil systems to record signals related to the signals induced in said detector coils when said solenoids are energized from said alternating current source.

2. A method of determining the direction along which there is a maximum fluid transmissibility within a selected portion of a permeable formation between a pair of wells that encounter the formation, said method comprising: individually and simultaneously positioning a measuring instrument within each of the wells at a depth adjacent to the selected portion of the formation; measuring the azimuthal and vertical orientation of the measuring instrument in each of said positions; measuring the formation horizontal conductivity anisotropy and the formation dip of the selected portion of the formation adjacent to the measuring instrument in each of said positions; and combining the measured values to determine the azimuthal direction of the maximum formation horizontal conductivity in a direction lying in the bedding plane of the selected portions of the formation adjacent to the measuring instrument in each of said positions.

3. A method of determining characteristics of an earth formation penetrated by a borehole, said method comprising: generating within the borehole opposite said earth formation at least two electromagnetic source fields having frequencies in the range between audio and radio frequencies and axes substantially parallel and perpendicular respectively to the axis of the borehole; detecting in a detector coil system a plurality of voltage signals adjacent said formation that are induced by the effect of said source fields on said formation, said detector coil system having a plurality of coil means that provide a plurality of effective axes disposed in predetermined relationship to the axes of said source fields; rotating the source fields to provide a plurality of effective axes in synchronism with said detector coil system axes; correlating the phase of the voltage signal from a coil of said detector coil system having an axis normal to both axes of said source fields with both the phase and the phase quadrature of said source field to obtain a first and a second information signals; correlating the phase of the net voltage signal from two coils of said detector coil system having axes parallel to the borehole axis with the phase of said source field to obtain a third information signal; correlating the phase of the voltage signal from a coil of said detector coil system having an axis normal to the borehole axes and parallel to the axis of the same field whose axis is perpendicular to the borehole axis with the phase of said source field to obtain a fourth information signal; wherein said first and second signals are a function of both the dip of the formation and the horizontal conductivity anisotropy of the formation, said third signal being a function of the formation horizontal conductivity, and said fourth signal is a function of the formation transverse conductivity anisotropy.

References Cited by the Examiner

UNITED STATES PATENTS

| | | | |
|---|---|---|---|
| 2,183,565 | 12/39 | Hawley | 324—1 |
| 2,220,070 | 11/40 | Aiken | 324—6 |
| 2,220,788 | 11/40 | Lohman | 324—6 |
| 2,291,692 | 8/42 | Cloud | 324—8 |
| 2,359,894 | 10/44 | Brown et al. | 324—8 |
| 2,401,280 | 5/46 | Walstrom | 324—8 |
| 2,623,924 | 12/52 | Cartier et al. | 324—6 X |
| 2,716,730 | 8/55 | Williams | 324—8 |
| 2,723,374 | 11/55 | Williams | 324—8 X |
| 2,929,984 | 3/60 | Puranen et al. | 324—3 X |
| 2,931,973 | 4/60 | Puranen | 324—6 |
| 2,948,847 | 8/60 | Bravenec et al. | 324—6 X |

WALTER L. CARLSON, *Primary Examiner.*

FREDERICK M. STRADER, *Examiner.*